Patented July 15, 1952

2,603,630

UNITED STATES PATENT OFFICE 2,603,630

METHOD FOR EXTRACTING PROTEINS FROM YEAST

Robert S. Aries, Brooklyn, N. Y.

No Drawing. Application December 31, 1948, Serial No. 68,749

1 Claim. (Cl. 260—112)

This invention relates to methods of preparing proteinaceous yeast adhesives from yeast, and to proteinaceous yeast adhesive.

It is an object of this invention to prepare an adhesive from yeast proteins.

It is also an object of this invention to prepare a coating composition for coating paper for the printing art.

It is a further object of this invention to obtain yeast proteins, useful as adhesives, by novel processes.

These and other objects will be apparent from the following description.

I have discovered that yeast adhesive may be made by extraction of the protein substance from yeast and converting these yeast proteins to an adhesive. In performing my process I extract the yeast cells, which preferably are used in a oven-dried or air-dried state, with petroleum ether (boiling point range 30° to 60° C.) in order to remove the yeast fats and oils and also to make the yeast cells permeable to subsequently employed solutions. The oil and fat extraction process may be conducted in any conventional extractor, for example, in a Soxhlet extractor and other fat oil solvents may be used in lieu of petroleum ether. Thus chlorinated hydrocarbons such as carbon tetrachloride, and organic solvents such as ethyl ether are applicable in lieu of the petroleum ether.

The extracted yeast is then air-dried, to free it from any solvent absorbed by the cells. Next the air-dried yeast is extracted with .05 normal sodium hydroxide solution for one hour at room temperature. A suitable quantity ratio of dried yeast to sodium hydroxide solution used for extraction is 25 grams dried yeast to 500 c. c. of the .05 normal sodium hydroxide solution. This quantity ratio is not critical and from 20 to 30 grams of air dried yeast, extracted under the above conditions with 400 to 600 c. c. of .05 normal sodium hydroxide solution will give good results.

The extracted yeast cells are next removed from the alkaline hydroxide solution preferably by means of high speed centrifuging. The extracted yeast residue cells may be further treated with a lesser quantity of .05 normal sodium hydroxide solution to remove any protein that may have escaped extraction during the first alkaline extraction procedure. For the second extraction procedure the residue from the first extraction procedure may be treated with about 300 c. c. of .05 normal sodium hydroxide.

The purpose of the alkaline hydroxide treatment is to extract the yeast proteins from the yeast cells. Alternately alkaline equivalents of sodium hydroxide such as potassium, ammonium and quaternary ammonium hydroxide may be substituted on a molar basis for the specific alkaline hydroxide used for purposes of illustrating my invention.

The alkaline extracts containing the yeast protein are combined and they are next diluted to about 1,000 c. c. The isoelectric point of the yeast protein was next determined by adding varying amounts of dilute sulphuric acid to 50 c. c. portions of the diluted extract. A few drops of isoamyl alcohol were added to prevent foaming and the 50 c. c. volumes were then diluted to 100 c. c. with distilled water. After vigorous shaking a precipitate of yeast protein was obtained which is best separated from the aqueous phase by centrifuging, though other methods of separating precipitates such as filtration, for example, are applicable. I have found that maximum precipitation of yeast proteins takes place throughout a pH acid range of 3.15 to 3.45. About 2 grams of yeast protein was obtained from the 25 grams air-dried yeast sample mentioned previously. Larger amounts of yeast protein, up to four grams or more can be obtained from 25 grams of yeast depending upon the condition of the yeast cells, specie of yeast cells used, etc. Thus brewer's yeast, baker's yeast or yeast from waste sulfite liquor solutions will cause some variance in the per cent. yeast protein recoverable.

The yeast protein obtained as above indicated was next air-dried and used as an adhesive to prepare a coated paper. The coating composition used contained 42 per cent. solids, using a protein yeast adhesive to clay pigment ratio of 13 per cent. The coating composition was dispersed by stirring with the aid of a small amount of ammonium hydroxide to make the solution faintly alkaline, as well as with the aid of mild heating to 70° C. or thereabouts. I have discovered that the yeast protein gelatinized upon the addition of the ammonium hydroxide and thus behaved similarly to casein under like treatment.

Next 40 pound paper base stock (11 inch by 17 inch sheets, 500 sheets to a ream) was coated with the above yeast protein dispersion using various Bird film applicator blades. The blades were six inches long and had clearances of either .005 inch, .0015 inch or .003 inch. The paper to be coated was secured to smooth glass plates by means of Scotch tape and a small amount of the yeast protein dispersion was spilled in front of the blade, whereupon the blade was pulled with constant speed across the paper stock. The coated sheets were then air-dried. In all cases the felt side of the paper stock was coated and the coating was always applied against the machine direction of the paper. The coated test sheets after air-drying were weighed to determine the weight of the coating applied. In all cases the coating weight was adjusted to 15 pounds ±1 pound for a 500 sheet ream of a 25 inch by 38 inch sheet, by use of the various Bird applicator blades along with an adjustment in solids content of the coating composition, if desirable. All coated stock was conditioned over night at 65 per cent. relative humidity and 70° F. The conditioned sheets were tested as follows: (1) Dennison wax test for adhesive strength, (2) color and brightness and (3) ink receptivity.

Generally small amounts of vitreous sodium phosphate ($Na_4P_2O_7$) is used in coating practice to help disperse the pigment. About 0.5 per cent of such phosphate suffices. Also about 1 per cent pine oil is used in standard coating procedure to assist the wetability of pigment. The use of vitreous sodium phosphate and pine oil is common practice when using casein as the adhesive for coating paper stock. The yeast protein coatings prepared by the above methods compared favorably to casein papers of similar solids contents using the same clay pigment. This is particularly true if fresh yeast is used as the source material for the obtaining of yeast proteins. If dried yeast is used, especially if over-heated during the drying process, the quality of the yeast proteins is effected in a deleterious manner and the adhesiveness of yeast proteins obtained from such sources is adversely effected. The specie of yeast used, of which there are over 2,000 species, also effects the adhesive quality of the resultant yeast proteins. Thus *Saccharomyces cerevisae* and *Torula utilis* give yeast proteins showing a variance in adhesiveness.

Another method of obtaining yeast proteins of suitable adhesive properties is to centrifuge an aqueous dispersion of yeast followed by a redispersion of the yeast cells in distilled water. The result of this treatment is to burst open the yeast cells through the influence of osmotic pressure. The yeast proteins are then precipitated with sodium sulfate or other suitable water-soluble salt equivalent, preferably at the isoelectric point. The salt is next removed by means of dialysis, preferably by electrodialysis. Adhesives prepared by this method are whiter than those prepared by the use of alkaline reagents.

The precipitation of the dispersed proteins from the bursted cells can be accomplished by dilution of the dispersion with alcohol in lieu of a salt. And while ethyl alcohol is preferred, other water soluble alcohols are effective. The alcoholic solution is then flashed in a vacuum to volatilize the alcohol. The alcoholic vapors are next condensed and thereafter reused for precipitation of more yeast protein. Yeast proteins obtained by my alcoholic process are fat free and exhibit marked adhesive properties.

I have also discovered that my yeast proteins are compatible with casein to yield an adhesive of improved qualities. The amount of casein I may add to my yeast protein adhesive may vary throughout a wide range. Thus one per cent. casein exhibits detectable improvements over the casein free yeast protein. When the percentage of casein is increased to between 40 to 50 per cent., the mixture of casein and yeast protein is a very effective adhesive combination. However, amounts of casein to yeast proteins above the 50 per cent. casein limit may be used advantageously in some instances, and combinations where the casein predominates are intended to be covered within the scope of this invention. Also in lieu of casein other proteins may be substituted. Thus soya-bean protein, especially the Alpha Protein of the Glidden Co., yields a satisfactory combination soya-bean protein admixed with yeast protein useful in the adhesive art, especially in the field of paper coating compositions. Similarly I have discovered that my yeast protein are compatible with starch to yield a combination adhesive of good adhesive properties.

Having disclosed my invention by means of illustrative embodiments, it is to be clearly understood that the scope of my invention is not to be limited to these embodiments but rather by the extent of the scope of my claim.

I claim:

The method of preparing yeast proteins having adhesive properties comprising extracting dried yeast cells with a fat and oil solvent to remove the fats and oils from the yeast cells and to make the yeast cells permeable to dilute alkaline solution, drying the solvent extracted yeast cells, treating the dried extracted yeast cells with a dilute alkaline solution in order to dissolve the adhesive yeast proteins from the oil and fat free yeast cells, removing the yeast cells from the alkaline solution of adhesive yeast protein, and acidifying said alkaline yeast protein solution with sulfuric acid to a pH range of from about 3.15 to about 3.45 to precipitate adhesive yeast protein.

ROBERT S. ARIES.

REFERENCES CITED

The following references are of record in the file of this patent:

UNITED STATES PATENTS

| Number | Name | Date |
| --- | --- | --- |
| 637,353 | Schwickerath | Nov. 21, 1899 |
| 1,245,980 | Satow | Nov. 6, 1917 |
| 1,319,666 | Krause et al. | Oct. 21, 1919 |
| 1,367,886 | Nooser | Feb. 8, 1921 |
| 1,392,849 | Plauson | Oct. 4, 1921 |
| 1,395,729 | Plauson | Nov. 1, 1921 |
| 2,184,748 | Light et al. | Dec. 26, 1939 |
| 2,230,624 | McLean | Feb. 4, 1941 |
| 2,301,242 | Billaudet | Nov. 10, 1942 |
| 2,384,673 | Grettie | Sept. 11, 1945 |
| 2,388,910 | Eweson | Nov. 13, 1945 |